United States Patent
Scott et al.

(10) Patent No.: US 7,027,567 B1
(45) Date of Patent: Apr. 11, 2006

(54) SYSTEM AND METHOD FOR ELECTRONIC MESSAGE STATUS NOTIFICATION AND REPLY USING VARIOUS ELECTRONIC MEDIA

(75) Inventors: David A. Scott, Norcross, GA (US); Stephen R. LaPierre, Union City, GA (US); Joseph M. Knoerle, Atlanta, GA (US); Vernon Meadows, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 556 days.

(21) Appl. No.: 09/894,498
(22) Filed: Jun. 28, 2001

(51) Int. Cl.
*H09M 1/64* (2006.01)
(52) U.S. Cl. .............. 379/88.12; 379/88.25; 455/412.2
(58) Field of Classification Search ............ 379/88.22, 379/88.17, 88.13, 88.12, 88.11, 88.23, 88.25
See application file for complete search history.

(56) References Cited

U.S. PATENT DOCUMENTS

| | | | |
|---|---|---|---|
| 4,582,959 A * | 4/1986 | Myslinski et al. | 379/88.12 |
| 5,155,761 A | 10/1992 | Hammond | |
| 5,363,431 A * | 11/1994 | Schull et al. | 379/88.12 |

(Continued)

OTHER PUBLICATIONS

G. Vaudreuil, G. Parsons, "Voice Profile for Internet Mail," RFC2421, The Internet Society (Sep. 1998) pp. 1-39.

Arthur Rosenberg, David Zimmer, "IP Infrastructure: The Fastest Track for Tomorrow's Unified Communications," The Unified View Report (Oct. 2000) pp. 1-16, Warrington, PA, Atlantic Regional Office.

(Continued)

*Primary Examiner*—Fan Tsang
*Assistant Examiner*—Gerald Gauthier
(74) *Attorney, Agent, or Firm*—Cantor Colburn LLP

(57) ABSTRACT

This invention is directed to a system and method for providing a status notification and reply for a message in a communications network. An embodiment of this invention is a voicemail system, which provides a caller in a telecommunications network with the option of requesting a status notification and reply for a voicemail message when the recording of the message is complete. By requesting status notification and reply, the caller is indicating that the voicemail system should track any actions related to the message that occur within the voicemail system. The caller also specifies a destination identifier, which includes formatting and addressing information that the voicemail system uses for subsequent notification and for communicating any reply to the message. As actions are taken in relation to the message, the voicemail system creates disposition identifiers and associates these identifiers with the message. When a triggering event occurs, such as the recipient deleting the message, the voicemail system retrieves the disposition identifiers to generate the status notification and sends the status notification in the format and to the address specified by the destination identifier. If the recipient replies to the message, the voicemail system also communicates the reply in the format and to the address specified by the destination identifier.

9 Claims, 4 Drawing Sheets

U.S. PATENT DOCUMENTS

| | | | |
|---|---|---|---|
| 5,406,616 A | | 4/1995 | Bjorndahl |
| 5,751,960 A | * | 5/1998 | Matsunaga ............... 379/93.24 |
| 5,784,438 A | | 7/1998 | Martinez |
| 5,793,771 A | | 8/1998 | Darland et al. |
| 5,944,786 A | * | 8/1999 | Quinn .................... 379/88.12 |
| 5,995,894 A | * | 11/1999 | Wendte ....................... 701/50 |
| 6,032,039 A | | 2/2000 | Kaplan |
| 6,173,047 B1 | | 1/2001 | Malik |
| 6,175,859 B1 | | 1/2001 | Mohler |
| 6,292,544 B1 | * | 9/2001 | Detering et al. ......... 379/88.12 |
| 6,337,899 B1 | * | 1/2002 | Alcendor et al. ........ 379/88.17 |
| 6,498,835 B1 | * | 12/2002 | Skladman et al. ....... 379/88.12 |
| 6,535,585 B1 | * | 3/2003 | Hanson et al. ........... 379/88.12 |

OTHER PUBLICATIONS

"Computerized Call Return Feature," IBM Technical Disclosure Bulletin (Apr. 1986) pp. 4897-4901.

"BellSouth Memory Call Voicemail Services," BellSouth (1999) pp. 1-3.

"Products—Impact Voice Mail Server Deluxe," Black Ice Software Inc. (1997) pp. 1-5.

R. Fajman, "An Extensible Message Format for Message Disposition Notifications," RFC2298, The Internet Society (Mar. 1998) pp. 1-21.

* cited by examiner

SYSTEM AND METHOD FOR ELECTRONIC MESSAGE STATUS NOTIFICATION AND REPLY USING VARIOUS ELECTRONIC MEDIA

CROSS-REFERENCE TO RELATED APPLICATION

This application relates to Application Ser. No. 09/894,542, filed simultaneously, entitled "System and Method for Electronic Message Status Certification," which is incorporated herein by reference. This application relates to Application Ser. No. 09/894,296, filed simultaneously, entitled "System and Method for Electronic Message Status Notification," which is incorporated herein by reference. This application relates to Application Ser. No. 09/894,317, filed simultaneously, entitled "System and Method for Voicemail Message Certification and Reply Using A Temporary Voicemail Service," which is incorporated herein by reference. This application relates to Application Ser. No. 09/894,494, filed simultaneously, entitled "System and Method for Electronic Message Reply Option Selection Notification," which is incorporated herein by reference.

NOTICE OF COPYRIGHT PROTECTION

A portion of the disclosure of this patent document and its Figures contain material subject to copyright protection. The copyright owner has no objection to the facsimile reproduction by anyone of the patent document or the patent disclosure, but otherwise reserves all copyrights whatsoever.

FIELD OF THE INVENTION

This invention generally relates to the field of electronic messaging. This invention more particularly relates to providing status notification and reply for a message in an electronic communications network using various electronic media. An embodiment of this invention is particularly advantageous for providing status notification and reply for a message in a voicemail system.

BACKGROUND

I. Overview

Electronic messaging services have become critical to the efficient operation of business. These services have also become an indispensable tool for many individuals. As the importance of electronic messaging services has grown, so has the importance of providing these services in a reliable, robust and cost-effective manner. The markets in which the service providers provide these services have also become highly competitive, and this competitive environment exerts additional pressure on the service providers to continually improve electronic messaging services. Service providers see erosion in their existing subscriber base as competitive service providers continue to make it easier and attractive to migrate to their service offerings. An inability to change service offerings to keep pace with functional requirements causes additional erosion. In order to compete effectively and increase subscriber base, a service provider must endeavor to provide the highest possible level of sought-after services while simultaneously delivering those services at a reasonable price.

Electronic messaging service providers currently provide a plurality of specialized value-added services to both business and individual users. Although the earliest true electronic messaging can be traced back to 1844 and the advent of the first practical electric telegraph system; electronic messaging now principally includes messaging via e-mail, facsimile, interactive paging and voice communications systems, both wired and wireless. However, electronic messaging is by no means limited to these mediums. For example, various video mail solutions are becoming widely available. For example, Pacific Image Communications offers a home or small-office/home-office (SOHO) product, Super Voice® Videomail, that allows the attachment of a video and audio message to a standard e-mail message. (Super Voice® is a registered trademark of Pacific Image Communications, Inc.)

Also, videophones and video conferencing are now ubiquitous in large businesses. High-speed data lines, which were until recently limited to high-cost dedicated lines, have migrated to the home in the form of digital subscriber lines (xDSL) and cable-modems. This increase in available bandwidth enables a higher level of electronic messaging service content in the home, and in combination with readily available video communications equipment will expand the demand for video-based messaging services in the home as well.

Electronic messaging services beyond the basic sending, receiving and storing of messages differ somewhat depending on the medium in which the message is being transmitted. These services include, but are most certainly not limited to, message forwarding, automatic message replies and message blocking. Despite a proliferation of available messaging services, a basic service that is still lacking is a robust and flexible method of communicating a status notification and reply.

II. Message Disposition

Most widely available e-mail systems adhere to Internet standards as set forth in the Requests for Comment (RFC). Generally, those systems that do not specifically adhere to the Internet standards, such as those systems which adhere to the International Telecommunications Union (ITU-T) X.400 standards, provide interfaces, which in turn provide Internet standards compatibility. Adherence to the Internet standards includes providing a means of status notification to the sender in the form of a message disposition notification (MDN). As those skilled in the art are sure to recognize, disposition in this sense is not limited to a final action taken on a message but rather includes any action directed to the message after successful delivery. Although e-mail systems adhering to the standards do provide MDN, the provision is subject to a variety of limitations. RFC 2298, the draft standard for MDN, defines a Multipurpose Internet Mail Extension (MIME) content-type that a messaging system uses to report the disposition of a message after successful delivery. The standard defines disposition event types, which include, but are not limited to, displayed, dispatched, deleted, denied and mailbox-terminated events. Dispatch of a message means to send the message to a destination; dispatch includes forwarding, replying and any other act, which would result in sending the message to a destination. When any of the disposition events occurs, an e-mail system adhering to the standard sends a disposition notification message to a mailbox specified by the original sender in the header of the original message.

Voicemail services and systems function within telecommunications networks, and modern telecommunications networks adhere to a common set of industry-specific standards. However, the actual feature sets included in voicemail and other value-added services are not the subject of these standards. Instead, the service providers and their suppliers are responsible for determining the feature set that they include in a particular service. The provision of status notification in voicemail services is even more limited than in e-mail systems. One exemplary voicemail service is the BellSouth® MemoryCall® service. MemoryCall® provides status notification in the form of a confirmation that a message has been accessed. When the recipient of the voicemail message accesses the message, a confirmation message is created and stored in the voicemail box of the originating caller. The originating caller must be an existing subscriber to the MemoryCall® service, i.e., the voicemail box must be preexisting. (BellSouth® is a registered trademark of BellSouth Intellectual Property Corporation. MemoryCall® is a registered service mark of BellSouth Corporation.)

E-mail and voicemail systems are subject to a number of limitations in the provision of message disposition notification. First, in an e-mail messaging system adhering to RFC 2298, the recipient of the disposition notification must be identified as an attribute in the header of the original message (Disposition-Notification-To). The attribute must specify a valid mailbox to which a disposition is subsequently sent. The mailbox refers to another e-mail address; the sender cannot specify varying mediums within which to reply. The original sender of a message has no flexibility in the manner of status notification and limited flexibility in the return address. Also, as stated above, to utilize voicemail confirmation in the MemoryCall® service, the caller must also be an existing subscriber of the service, i.e., the caller must have a predefined relationship with the voicemail system. Since the telecommunication service provider generally provides this type of service, this requirement limits the availability of this feature to those callers living or working within in a specific region, or perhaps, even within a specific community. Once again, the recipient cannot specify an alternate medium within which to send the confirmation.

Another limitation of current electronic messaging systems is that they identify a message in a disposition notification or confirmation only by attributes of the message such as the recipient, the date created and perhaps a portion of the message. It can be quite difficult for a sender or caller to associate the disposition notification with the correct message. For instance, if a sender or caller using one of these services sends a particular recipient multiple messages on the same day, it is very difficult for the sender to determine to which message the disposition notification applies.

Some of the limitations on disposition notification apply primarily to a specific medium. For example, a limitation of current e-mail systems is that a disposition notification message must be sent for each disposition of the message. Depending on the requirements of the sender, many of the disposition messages provided will be at least valueless and at worst distracting and irritating.

A limitation peculiar to voicemail systems is the inability to monitor a range of disposition event types when the recipient accesses the message. A caller may wish to know whether or not the recipient deleted a message without listening to it, forwarded the message to another party, or if the recipient was deleted from the voicemail system without ever having accessed the message. This information is unavailable in current voicemail services.

III. Reply

Regardless of the communication media, the participants, both senders and recipients, have the ability to manually initiate subsequent communications. The limitations in current communications systems relate to the ability to issue a response in the form of another electronic message utilizing varying electronic communication media. In other words, although the recipient of an e-mail or voicemail message generally has the means to respond to a message, the ability to respond is limited to the communication medium within which the communication is received. Also, although various media types have been integrated successfully within various messaging systems, a recipient has no level of assurance that the originator can receive a reply to the message.

The available means of responding to a message differ depending on the medium. In an e-mail system, the recipient may respond to the e-mail address of the sender or an e-mail address that the sender has specified as the response address. The response is in the form of an e-mail message. A voicemail system may provide various means for the recipient of a message to respond. If the original caller is a subscriber to the same voicemail service as the recipient, the recipient may have the option of responding directly to the message in the form of a voicemail message, which is then stored in the original caller's voicemail or automatically placing a direct call to the original caller. If the original caller is not a subscriber to the same voicemail service as the recipient, the recipient may still have the option to automatically place a call to the original caller by using an additional service, such as caller-ID. However, as in e-mail, the response to the voicemail message is another voicemail message or voice communication.

SUMMARY OF THE INVENTION

This invention is directed to a system and method for providing a status notification and reply for a message in a communications network. An embodiment of this invention includes a voicemail system, which provides a caller in a telecommunications network with the option of requesting status notification and reply for a voicemail message when the recording of the message is complete. By requesting status notification and reply, the caller is indicating that the voicemail system should track any actions related to the message that occur within the voicemail system and, in response to a triggering event, notify the original caller of the status of the message. When a caller requests status notification, the caller also specifies a destination format and address for the status notification, such as a text format and an e-mail address. The voicemail system uses the destination format and address to communicate both the status notification and reply. The voicemail system stores the message, message identifiers, which the system uses to identify the message and to indicate that the message requires notification, a destination identifier, which contains the format and address information used for communicating the status notification and reply, and disposition identifiers, which the system uses to track the disposition events described below.

Disposition events include actions taken relative to the message, including message recipient actions, voicemail system administrator actions and actions resulting from an automatic event executed by the voicemail system. The events include managing events, such as accessing or deleting the message, and dispatching events, such as forwarding the message. When any of these events occur, the system stores additional data elements, herein referred to as disposition identifiers, with the message. In response to a triggering event, the voicemail system compiles the message and disposition identifiers to ascertain the status of a message and to generate a status notification. The system communicates the status notification in the format and to the address specified by the destination identifier. The messaging system administrator specifies triggering events. Triggering events include both specified disposition events and the passage of a certain period of time. The system administrator may specify additional triggering events as well. In addition, the voicemail system allows the recipient of the message to reply to the message. The voicemail system communicates the reply in the format and to the address specified by the original caller.

An embodiment of this invention provides numerous advantages over current electronic messaging systems. One advantage is that the system allows the sender to specify various return addresses and formats. For example, a caller may leave a message from their cell phone while traveling. Rather than receive a charge for the call and for the minutes required by a subsequent return call relaying the status notification and reply, the caller may choose status notification via e-mail. An embodiment of this invention as a voicemail service provides further advantages over current voicemail offerings. Current voicemail services simply store a confirmation message in an existing subscriber's voicemail box, indicating that a message has been accessed. An embodiment of this invention allows subscribers and non-subscribers alike to receive status information and replies without a voicemail box. Also, an embodiment of this invention tracks multiple disposition events, providing the requestor with much more information than is available in current voicemail services. Another advantage of this invention is the ability for a caller to add an annotation to the message to identify a particular message more accurately. Also, because status notifications are only sent as the result of a triggering event, a status notification will not be sent after every disposition event relating to the message.

BRIEF DESCRIPTION OF THE FIGURES

These and other features, aspects, and advantages of this invention are better understood when the following Detailed Description of the Invention is read with reference to the accompanying drawings, wherein.

DETAILED DESCRIPTION OF THE INVENTION

Figure 1:
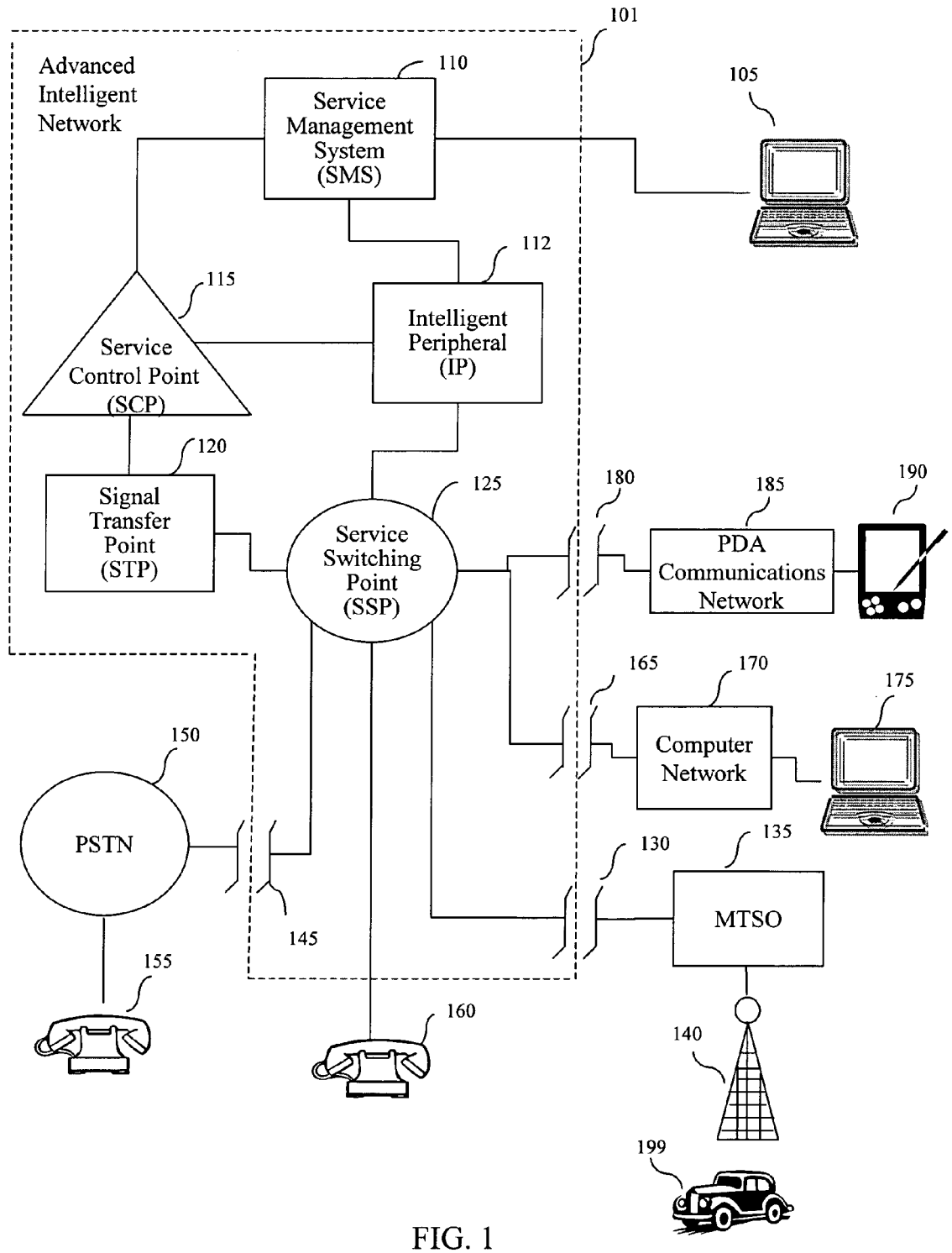
FIG. 1 is a diagram of an exemplary embodiment and an exemplary environment for operation of this invention.

As described above, this invention provides a system and method for providing a status notification and reply for a message in a communications network. An embodiment of this invention includes a processor to assign a message identifier for the message, receive a destination identifier, and associate the destination identifier with the message. The processor creates a disposition identifier in response to a disposition event and associates the disposition identifier with the message. In response to a triggering event, the processor compiles the message and disposition identifiers to generate a status notification. The processor communicates the status notification in the format and to the address specified by the originator of the message and stored as a destination identifier. The processor also receives a reply, associates the reply with the message and communicates the reply in accordance with the destination identifier.

For a messaging system to successfully track messages as they move into and out of the system, the system must associate identifying information with the messages. An embodiment of this invention associates message identifiers with a message to facilitate tracking of the message. Message identifiers are discreet data elements describing the message. The message identifiers distinctly identify an individual message and its contents and also identify information contained in the header of the message, such as the source and destination of the message, the communication network within or across which a message has traversed, the parties to the message, and the dates and times at which certain message related events occur. Message identifiers, which describe the contents of the message, include at least one of: a type identifier, an alphanumeric identifier, a capabilities identifier and/or an annotation. A type identifier includes information regarding the format of the message, such as text, rich text format (RTF) or HTML. An alphanumeric identifier is an identifier consisting of both alphabetic and numeric symbols. In an embodiment of this invention, the alphanumeric identifier is a unique code assigned to each message within the messaging system. A capabilities identifier describes the media capabilities required to successfully present the message. For example, if the message contains a video clip, the messaging system must include or have access to a video media player to successfully present the message. An annotation allows the originator of a message to later identify the message. For example, a caller might record a brief audio annotation such as "lunch on May $1^{st}$" with a message to more easily identify the original message when the caller receives a subsequent status notification.

In an embodiment of this invention, message identifiers that describe the header information contained in the message include at least one of: a communication network identifier, a device identifier, a role identifier, a party identifier, a date identifier and/or a time identifier. A communications network identifier describes the type of network the message traversed as well as identifying various components of the network. For example, if an e-mail message originates on the Internet, the IP address associated with either the simple mail transfer protocol (SMTP) or post office protocol (POP) server is associated with the message.

A device identifier describes the type of device used in a communication, identifies an actual device, and/or describes a device's capabilities with respect to voice, text and multimedia. For example, in one embodiment of this invention, the device on which the message originates is a computer on the Internet. If the computer has a static IP address, the system associates the IP address as a device identifier with the message. In an embodiment of this invention as a voicemail system, the system associates the dialing number of the originator as a device identifier with the message.

Identification of the parties to a communication is a critical requirement in any communications system, electronic or otherwise. A role identifier describes a role that a party plays in a communication, and a party identifier describes a party to the communication. Depending on the communication type, a party may participate in at least one of a number of roles, including, but certainly not limited to, originator, sender, caller, recipient, and/or system administrator. A party identifier, which identifies a party, includes at least one of: an email address, an access address, a voice sample, and an image. The applicable type of party identifier varies depending on the type of message and communications network. For example, in an embodiment of this invention as a voicemail system, a voice sample identifies a party to the message. An access address includes any address from which or to which the message is directed. For example, in an embodiment of this invention as a voicemail system, a caller leaves a message in the system, and the system stores the caller's dialing number as the access address.

Date and time identifiers provide the capability to track when events occur. For example, date and time identifiers are associated with messages to indicate when the message is sent, received and/or dispatched. Date and time identifiers are also associated with other events, such as the disposition events that are described below, to indicate when these events occur.

In an embodiment of this invention, the originator of the message specifies a destination identifier when requesting a status notification. A destination identifier includes an address identifier and a format identifier. The address identifier specifies to what address a status notification is to be sent and includes at least one of: an email address, and/or an access address. The format identifier specifies in what format the system creates and sends the status notification. The format identifier is related to the address identifier in that the device to which the address identifier refers should be capable of rendering the format specified in the format identifier. The format identifier includes at least one of: an audio format, a video format, a text format, a short message service format and/or a markup language document format. Short message service provides the ability to send a short alphanumeric message (160 characters) to a mobile phone operating in a Global System for Mobile Communications (GSM) network. A markup language format includes documents created using subsets of the structured general markup language (SGML), such as hypertext markup language (HTML), extensible markup language (XML) and video XML.

An embodiment of this invention compiles the message identifiers and disposition identifiers to generate a status notification. The system formats and communicates the status notification in accordance with the format and address as specified in the destination identifier. For example, in an embodiment of this invention as an e-mail system, the sender of the message specifies an audio format and a dialing number for notification. The e-mail system stores the sender's specification as a destination identifier and associates disposition identifiers with the message as changes occur. When a triggering event occurs, the e-mail system compiles the message and disposition identifiers to create the status notification, performs a text-to-speech conversion to format the notification and communicates the notification to the dialing number.

An embodiment of this invention includes disposition identifiers. The disposition identifiers provide a method of tracking changes to the status of the message when disposition events occur. A disposition event includes at least one of: a managing event and/or a dispatching event. A managing event includes management of the message, the messaging system and the identifiers associated with the message. A managing event includes at least one of: accessing the message, deleting the message, presenting an indication of the message, expiring the message, terminating a recipient of the message from the communications network, denying the status notification for the message, and/or a malfunctioning of the status notification for the message. An indication of the message is anything that brings the message's presence in the messaging system to the attention of the recipient. The recipient may or may not act on the message when the recipient receives the indication. For example, a messaging system indicates that two messages exist, but that only one is urgent. If the recipient accesses only the urgent message, the recipient has received indication of both messages, but only accessed one. Expiring the message refers to the deleting or inactivating of a message after a designated period of time. A dispatching of the message is any act that causes the original message to be sent to an address, such as forwarding the message and/or replying to the message. As the disposition events occur, the messaging system creates and associates additional disposition identifiers with the message. The compilation at any point in time of the disposition identifiers provides the current status of the message.

An embodiment of this invention communicates the notification in response to a triggering event. A triggering event includes at least one of: a disposition event, and/or a passage of time. The disposition events are the same as those described above. In one embodiment of this system, the system administrator specifies the triggering events. In another embodiment, the triggering events are pre-configured attributes in the messaging system.

An embodiment of this invention also receives a reply. The embodiment associates the reply with the message. The embodiment sends the reply in the format and to the address specified by the originator of the message.

Billing for services is a necessity for any communications service provider. An embodiment of this invention bills a party to the message for providing a status notification and reply for a message. Various embodiments of billing are possible. One embodiment bills the originator of the message when the originator requests a status notification. Another embodiment bills the recipient a flat monthly charge for making the service available for communications directed to the recipient.

In an embodiment of this invention, the messaging system processor includes a central processing unit as well as read-only memory (ROM) and random access memory (RAM). The system stores the attribute for the status notification in the processor's RAM. Storing the attribute in this manner ensures fast retrieval times. The attributes include at least one of: the message identifier, the destination identifier, the disposition identifier, the reply and the status notification. An alternative embodiment of this invention includes a data repository to store the attribute. The data repository provides somewhat slower data access but improves stability and recoverability of the system. In one embodiment of this invention, the data repository includes a single database. In another embodiment, the system includes multiple databases, a first database for storing the message, and a second for storing the attribute associated with a message.

An embodiment of this invention also provides administrative functions, including, but not limited to, deleting, monitoring, moving, forwarding, securing, archiving and backing up the attribute. These functions allow the administrator to effectively manage the resource requirements on the messaging system relative to the status notification requests. An embodiment of this invention also provides administrative functionality to the recipient of a message, including informing a recipient of an attribute or a message and blocking an attribute of a message.

As illustrated in FIG. 1, this invention is advantageously embodied as a system in an advanced intelligent network (AIN) 101, which provides advanced services such as voicemail. As is known to those skilled in the art, an AIN includes a plurality of hardware and software elements operating over industry standard communication protocols, including signaling system 7 (SS7). For the sake of brevity, only a basic description of the AIN is provided herein. For further information regarding aspects of the AIN, refer to Weisser, U.S. Pat. No. 5,430,719, which is incorporated herein by reference.

An embodiment of this invention includes an intelligent peripheral (IP) 112 to provide the status notification and reply functionality. An intelligent peripheral executes service logic programs or other similar software to provide advanced services in an AIN. An intelligent peripheral also includes dual-tone multi-frequency (DTMF) and voice recognition as well as voice synthesis capabilities.

A call is placed on a telephone 160 that is functionally connected to a service switching point (SSP) 125. An SSP is a central office switch that provides intelligent network functionality. Once the SSP collects the dialed digits, the SSP generates a trigger. A trigger generates a packet that is sent to a service control point (SCP) 115 through a signal transfer point (STP) 120, causing the SCP to query its database to determine whether to provide conventional telephone service or an enhanced service for the call. Signal transfer points are packet switching systems that can route and concentrate messages exchanged between service control points and service switching points. A service control point includes computer processors, application software and databases that control the setup, monitoring and termination of phone calls.

The SSP pauses as the trigger is routed through the STP 120 to the SCP 115. The SCP 115 looks up the record for the dialed number and determines that the calling line is busy and that the subscriber is also a subscriber to a voicemail service. The SCP sends packets back to the SSP via the STP 120. The SSP 125 establishes a voice and data link to the IP 112. The IP accepts the voicemail message and provides the caller with audio instructions regarding establishing a status notification and reply. The IP receives the destination information from the caller via DTMF recognition or voice recognition and stores the information, message and destination identifiers, in a database in the IP. The caller terminates the call, and all data and voice resources are released.

When the message recipient listens to the voicemail message, the IP 112 stores a disposition identifier with the message. The recipient's accessing the message is a triggering event as described above. In response to the triggering event, the IP compiles the message and disposition identifiers and creates a status notification. The IP formats and communicates the notification in accordance with the destination identifier. For example, if the original caller had requested an e-mail notification, the IP creates a simple text e-mail message. The IP also provides the recipient with the option of replying to the message. If the recipient does reply, the IP receives the reply and formats and communicates the reply in accordance with the destination identifier.

As is clear to one skilled in the art, multiple embodiments of this invention are possible. This invention may be embodied as a system in an advanced intelligent network (AIN), as a system including no AIN components or as a system which combines aspects both inside an outside an AIN. For example, the forwarding of a call to an intelligent peripheral may be a purely switch-based "call forward no answer" or "call forward busy."

SSP 125 also provides an interface between the AIN and termination points, such as an interface 130, 145, 165, 180. An interface, such as a router, gateway or other similar device, acts as a protocol converter between disparate networks.

The status notification is sent to any of a number of network access devices (NAD) 135, 160, 175, 190, 199. The NAD is functionally connected to the SSP 125 and is operative receive and render the status notification and reply. The status notification and reply take at least one of many forms, depending on the capabilities of the NAD. The NAD includes at least one of: a telephone 160, 135, a cellular-capable device 199, a personal digital assistant (PDA) 190 and/or a computer 175. The NAD may be connected directly to the SSP or may exist in a network, which is connected to the SSP via one or more of the afore mentioned interfaces In an embodiment of this invention, a mobile telephone switching office (MTSO) 135 is functionally connected to an interface 130, which is functionally connected to the SSP 125. The MTSO facilitates access of a cellular-capable device 199 to the AIN 101 and reception of the status notification and reply. Another embodiment of this invention also includes a computer network 170, which is functionally connected to an interface 165 and provides direct link or common web-based access to the AIN and further facilitates reception of the status notification and reply via a computer network client device 175. As is obvious to one skilled in the art, various other interfaces, external networks, such as the public switched telephone network 150, and access devices, such as a personal digital assistant, 190, provide access to the AIN.

An embodiment of this invention also includes administrative functionality. The administrative functionality is necessary for the convenience of the recipient and for the efficient management of the AIN 101. In an embodiment, the IP 112 is further operative to delete the identifiers, based on actions by the recipient, by the system administrator, or automatically based on variables such as the passage of time. An embodiment also includes functionality to the recipient of a voicemail message to provide flexibility and privacy in the recipient's use of the voicemail service. The IP is further operative to inform a recipient of a request for status notification and reply. Also, the IP is operative to allow a recipient to block a status notification on a particular message or to block status notification on all messages directed to the recipient.

An embodiment of this invention also includes further administrative functionality implemented through the use of another AIN element, a service management system (SMS). A SMS is an element designed to provide management and reporting capabilities to an AIN, such as managing software, service data and subscriber data updates and generating subscriber service reports. Referring again to FIG. 1, SMS 110 is functionally connected to IP 112 and SCP 115 and is operative to monitor the identifiers. The monitoring functionality includes subscriber service reports and broader system management reports as identified by an administrator of the system. The SMS is further operative to perform additional administrative functionalities such as specifying the status notification-triggering event. A terminal 105 provides access to present a graphical user interface to a system administrator or other user with access to the AIN. The graphical user interface provides administrative functionality, such as displaying the identifier monitoring reports.

Figure 2:
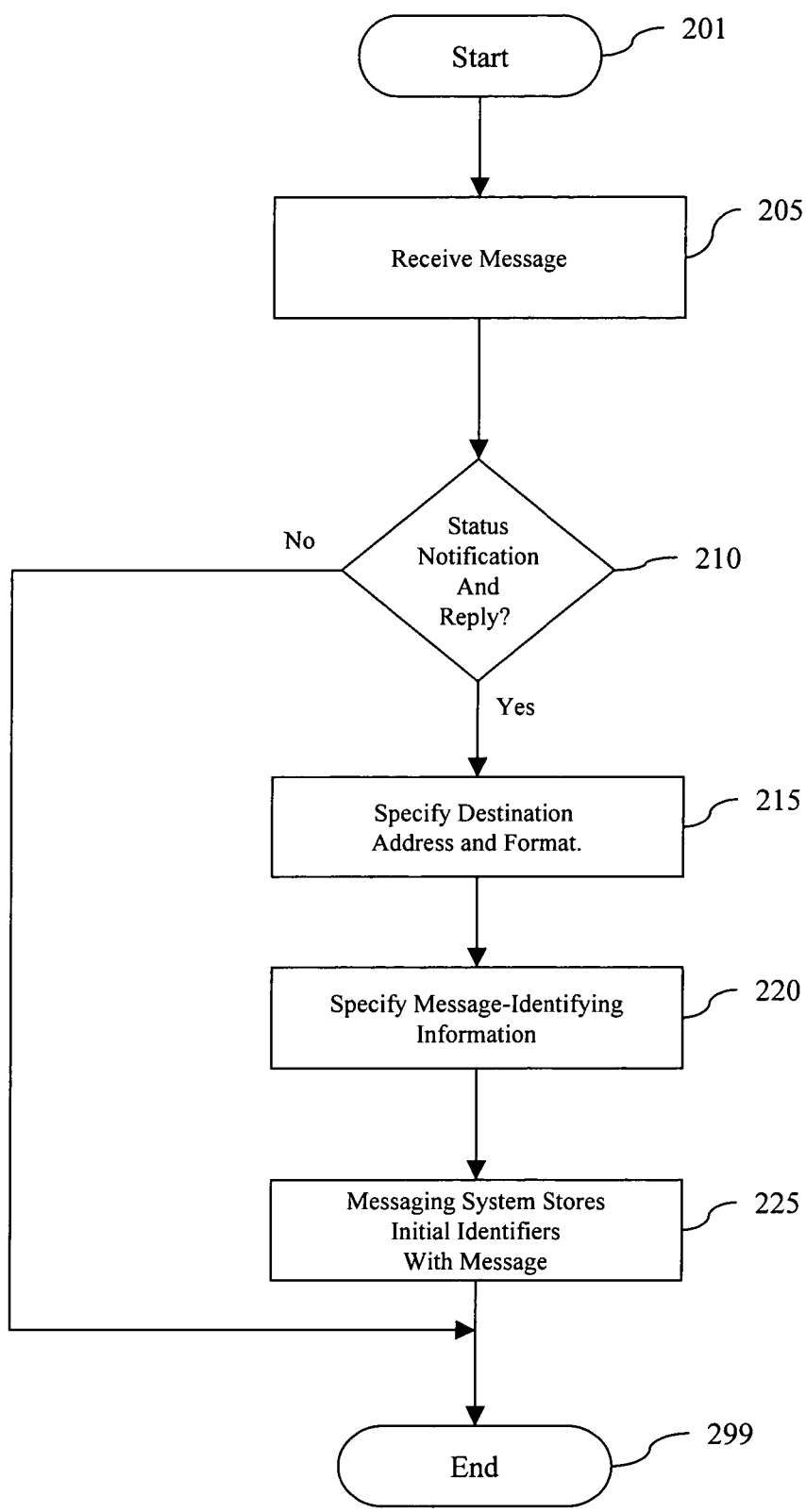
FIG. 2 is a flowchart illustrating an exemplary method for requesting status notification and reply for a message in an embodiment of this invention.
Figure 3:
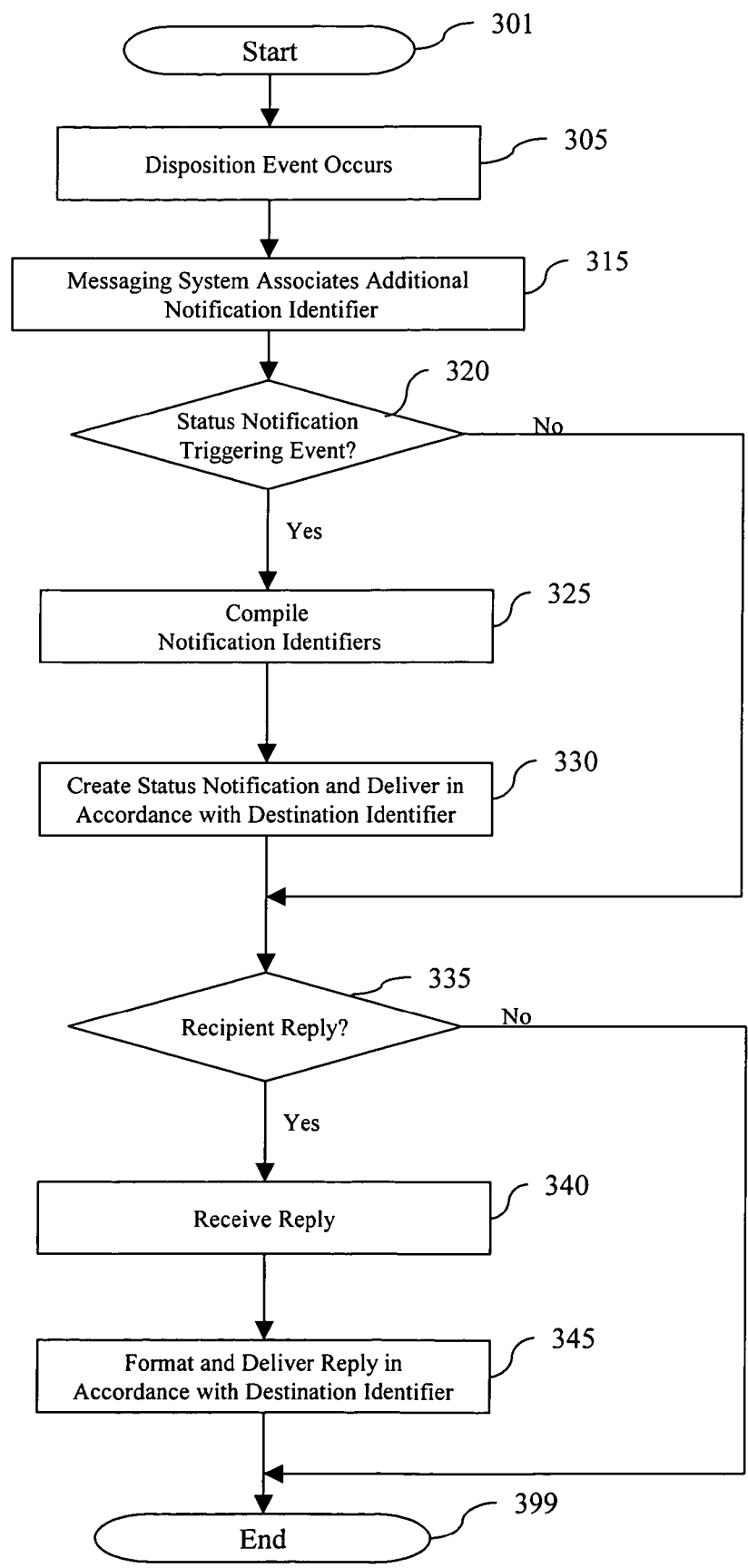
FIG. 3 is a flowchart illustrating an exemplary method for associating notification identifiers with a message and delivering the status notification and reply in accordance with a destination identifier in an embodiment of this invention.

In an embodiment of this invention, at least three discreet processes occur. First, an originator of a message creates a message, indicating a desire for a status notification and specifying the address and format of the notification and reply. Second, the recipient's messaging system maintains the identifiers necessary to provide the status notification. Third, the messaging system communicates a status notification and reply in accordance with the destination identifier and in response to a triggering event. FIGS. 2 and 3 provide a more detailed illustration of an embodiment of the steps carried out in accordance with this invention.

Referring to FIG. 2, the messaging system receives a message 205. The system provides the originator of the message with the option of enabling status notification and reply for the message 210. For example, in an embodiment of this invention as an e-mail system, the option is one of several options available when sending a message. In an embodiment of this invention as a voicemail system, the option is provided at the conclusion of the recording of the voicemail message. Referring again to FIG. 2, if the originator chooses to forgo status notification and reply, the process ends 299. If instead the originator decides to add status notification and reply, the system prompts the sender to specify an address to which the status notification and reply are to be sent and a format in which the status notification and reply are to be formatted 215. For example, the originator specifies an e-mail address and the system formats the status notification and reply as a text message or as two text messages. Alternatively, the originator specifies an access address, such as a dialing number, and specifies a corresponding audio format for delivery of the status notification and reply. The originator also specifies identification information regarding the message 220.

The recipient's messaging system associates an initial set of identifiers with the message 225. These identifiers include data about the sender, the recipient, the date and time of the call and any other data regarding the message as well as the destination address and format of the status notification and reply. Once the system stores the identifiers, the process is complete 299.

If the system has associated a request for status notification with a message, the recipient's messaging system associates disposition identifiers with the message whenever a status change occurs. Referring to FIG. 3, subsequently the recipient accesses the message 305, and in response, the recipient's messaging system associates an additional notification identifier with the message 315. The messaging system then determines whether the recipient's accessing the message is a status notification-triggering event 320. If the access is a triggering event, then the messaging system compiles the notification identifiers to create a status notification 325. The messaging system then delivers the status notification to address and in the format specified by the original sender and stored as a destination identifier 330. The system presents the recipient with the option of replying to the message 335. If the recipient replies, an embodiment of the system receives the reply 340 and then formats and delivers the reply in accordance with the destination identifier 345. Another embodiment of this invention combines the notification and reply into a single message before formatting and delivering the combined message in accordance with the destination identifier.

Figure 4:
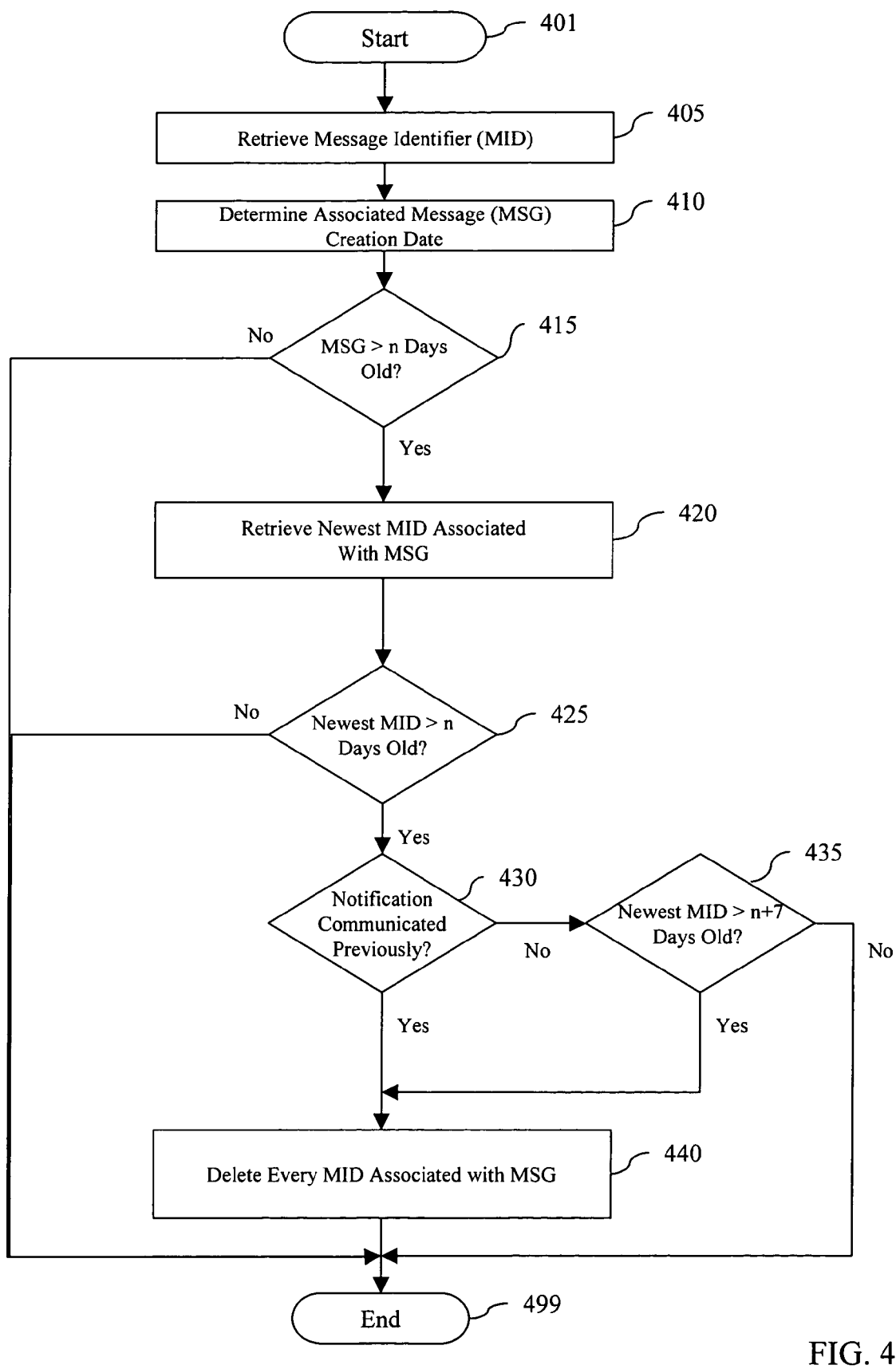
FIG. 4 is a flowchart illustrating an exemplary method for deleting a notification identifier after the passage of time in an embodiment of this invention.

An embodiment of this invention also provides administrative functionality. To ensure the efficient use of resources, an embodiment of this invention may delete, archive or otherwise transfer or dispose of the identifiers associated with a message. For example, in an embodiment of this invention, a system administrator identifies triggering events for the deletion of identifiers such as after status notification has been communicated or after the passage of a specified period of time. In one embodiment of this invention an automated process as illustrated in FIG. 4 deletes the identifiers after the passage of time. A system administrator specifies the number of days after which a set of identifiers is stale and can therefore be deleted from the system.

Referring to FIG. 4, the embodiment of the steps of this invention begins with the retrieval a message identifier (MID) 405. Once the MID has been retrieved, the system identifies the message with which the MID is associated 410. By examining the attributes of the message, including the date it was created, the system determines whether the age of the message is greater than a specified number of days (n) 415. The system administrator specifies the value of n prior to the beginning of this process, such as during the configuration of the messaging system. If the message is greater than n days old, the system retrieves the newest MID associated with the message 420; if the message is less than or equal to n days old, the process ends 499. The newest MID is the MID associated with the most recent disposition event related to the message.

The system determines whether the newest MID is greater than n days old 425. If so, the system determines whether or not communication of a status notification has occurred 430. If so, every MID associated with the message is deleted from the system 440. If status notification has not been communicated, the system next performs a further check to determine whether the newest MID is greater than n+7 days old or some other period as defined by the system administrator or user 435. If so, every MID associated with the message is deleted from the system 440. This process is repeated for each remaining MID in the system.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of this invention.

The invention claimed is:

1. A method for providing a status notification or reply for a message in a communications network comprising:

assigning a message identifier and a destination identifier to said message in response to a request of said status notification or reply from an originated caller, the destination identifier comprising a destination format and a destination address;

storing said message with said message identifier and said destination identifier;

generating said status notification or reply addressed and formatted according to said destination identifier, in response to a triggering event from a recipient;

assigning a disposition identifier to said message to track a change to a status of said message, said disposition identifier responding to a disposition event, the triggering event comprising the disposition event wherein said disposition event comprise of a managing event, wherein said managing event selected from a group comprising:

accessing said message;

deleting said message;

presenting an indication of said message;

expiring said message; and terminating the recipient of said message from said communications network.

2. A method for providing a status notification or reply for a message in a communications network comprising:
assigning a message identifier and a destination identifier to said message in response to a request of said status notification or reply from an originated caller, the destination identifier comprising a destination format and a destination address;
storing said message with said message identifier and said destination identifier;
generating said status notification or reply addressed and formatted according to said destination identifier, in response to a triggering event from a recipient;
assigning a disposition identifier to said message to track a change to a status of said message, said disposition identifier responding to a disposition event, the triggering event comprising the disposition event wherein said disposition event a managing event and a
wherein said managing event selected from a group comprising:
denying said status notification of said message; and
malfunctioning of said status notification of said message.

3. A method for providing a status notification or reply for a message in a communications network comprising:
assigning a message identifier and a destination identifier to said message in response to a request of said status notification or reply from an originated caller, the destination identifier comprising a destination format and a destination address;
storing said message with said message identifier and said destination identifier;
generating said status notification or reply addressed and formatted according to said destination identifier, in response to a triggering event from a recipient;
assigning a disposition identifier to said message to track a change to a status of said message, said disposition identifier responding to a disposition event, the triggering event comprising the disposition event wherein said disposition event and a dispatching event
wherein said dispatching event selected from a group comprising:
forwarding said message; and
replying to said message.

4. A system to provide a status notification or reply for a message in a communications network comprising:
a processor for prompting a message sender to assign a message identifier and a destination identifier for said message in response to a request of said status notification or reply from an originated caller, the destination identifier comprising a destination format and a destination address, said processor associating said message identifier and said destination identifier with said message, and said processor generating said status notification or reply addressed and formatted according to said destination identifier, in response to a triggering event form a recipient, wherein said processor is further operative to assign a disposition identifier to said message to track a change to a status of said message, said disposition identifier responding to a disposition event, said triggering event including said disposition event, wherein said disposition event comprises a managing event
wherein said managing event selected from a group comprising
accessing said message;
deleting said message;
presenting an indication of said message;
expiring said message; and
terminating the recipient of said message from said communications network.

5. A system to provide a status notification or reply for a message in a communications network comprising:
a processor for prompting a message sender to assign a message identifier and a destination identifier for said message in response to a request of said status notification or reply from an originated caller, the destination identifier comprising a destination format and a destination address, said processor associating said message identifier and said destination identifier with said message, and said processor generating said status notification or reply addressed and formatted according to said destination identifier, in response to a triggering event from a recipient, wherein said processor is further operative to assign a disposition identifier to said message to track a change to a status of said message, said disposition identifier responding to a disposition event, said triggering event including said disposition event, wherein said disposition event comprises a managing event,
wherein said managing event selected from a group comprising:
denying said status notification of said message; and
malfunctioning of said status notification of said message.

6. A system to provide a status notification or reply for a message in a communications network comprising:
a processor for prompting a message sender to assign a message identifier and a destination identifier for said message in response to a request of said status notification or reply from an originated caller, the destination identifier comprising a destination format and a destination address, said processor associating said message identifier and said destination identifier with said message, and said processor generating said status notification or reply addressed and formatted according to said destination identifier, in response to a triggering event from a recipient, wherein said processor is further operative to assign a disposition identifier to said message to track a change to a status of said message, said disposition identifier responding to a disposition event, said triggering event including said disposition event, wherein said disposition event comprises a dispatching event,
wherein said dispatching event selected from a group comprising
forwarding said message; and
replying to said message.

7. A system to provide a status notification or reply for a voicemail message in an advanced intelligence network (AIN) comprising an intelligent peripheral operative to:
prompt a message sender to assign a message identifier and a destination identifier for said message in response to a request of said status notification or reply from an originated caller, the destination identifier comprising a destination format and a destination address;
associate said message identifier and said destination identifier with said message; and
generate said status notification or reply addressed and formatted according to said destination identifier, in response to a triggering event from a recipient;
wherein said intelligent peripheral is further operative to assign a disposition identifier to said message to track a change to a status of said message, said disposition identifier responding to a disposition event, said triggering event including said disposition event wherein said disposition event comprises a managing event wherein said managing event selected from a group comprising:

accessing said message;

deleting said message;

presenting an indication of said message expiring said message; and terminating the recipient of said message from said AIN.

8. A system to provide a status notification or reply for a voicemail message in an advanced intelligence network (AIN) comprising an intelligent peripheral operative to:

prompt a message sender to assign a message identifier and a destination identifier for said message in response to a request of said status notification or reply from an originated caller, the destination identifier comprising a destination format and a destination address;

associate said message identifier and said destination identifier with said message; and generate said status notification or reply addressed and formatted according to said destination identifier, in response to a triggering event from a recipient;

wherein said intelligent peripheral is further operative to assign a disposition identifier to said message to track a change to a status of said message, said disposition identifier responding to a disposition event, said triggering event including said disposition event wherein said disposition event comprises a managing event wherein said managing event selected from a group comprising denying said status notification of said message; and malfunctioning of said status notification of said message.

9. A system to provide a status notification or reply for a voicemail message in an advanced intelligence network (AIN) comprising an intelligent peripheral operative to:

prompt a message sender to assign a message identifier and a destination identifier for said message in response to a request of said status notification or reply from an originated caller, the destination identifier comprising a destination format and a destination address;

associate said message identifier and said destination identifier with said message; and generate said status notification or reply addressed and formatted according to said destination identifier, in response to a triggering event from a recipient;

wherein said intelligent peripheral is further operative to assign a disposition identifier to said message to track a change to a status of said message, said disposition identifier responding to a disposition event, said triggering event including said disposition event wherein said disposition event comprises a dispatching event;

wherein said dispatching event selected from a group comprising:

forwarding said message; and replying to said message.

* * * * *